US008601016B2

(12) United States Patent
Briggs et al.

(10) Patent No.: US 8,601,016 B2
(45) Date of Patent: Dec. 3, 2013

(54) PRE-GENERATION OF STRUCTURED QUERY LANGUAGE (SQL) FROM APPLICATION PROGRAMMING INTERFACE (API) DEFINED QUERY SYSTEMS

(75) Inventors: Mario D. Briggs, Bangalore (IN); Praveen Devarao, Bangalore (IN); Abhigyan Agrawal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/221,169

(22) Filed: Aug. 30, 2011

(65) Prior Publication Data

US 2013/0054630 A1 Feb. 28, 2013

(51) Int. Cl.
*G06F 17/30* (2006.01)

(52) U.S. Cl.
USPC .......................................... 707/760; 707/713

(58) Field of Classification Search
USPC ......... 707/760, 722, 756, 602, 718, 713, 759, 707/693, 796
See application file for complete search history.

(56) References Cited

U.S. PATENT DOCUMENTS

| | | | | |
|---|---|---|---|---|
| 7,680,767 | B2 | 3/2010 | Adya et al. | |
| 2003/0233632 | A1* | 12/2003 | Aigen et al. | 717/106 |
| 2004/0088158 | A1* | 5/2004 | Sheu et al. | 704/9 |
| 2006/0085484 | A1* | 4/2006 | Raizman et al. | 707/200 |
| 2006/0089945 | A1* | 4/2006 | Paval | 707/102 |
| 2007/0027905 | A1* | 2/2007 | Warren et al. | 707/103 R |
| 2009/0144696 | A1* | 6/2009 | Andersen | 717/109 |
| 2009/0259683 | A1 | 10/2009 | Murty | |
| 2010/0293209 | A1 | 11/2010 | Bireley et al. | |

OTHER PUBLICATIONS

Carol Gould et al.; "JDBC Checker: A Static Analysis Tool for SQL/JDBC Applications"; pp. 1-2;—Software Engineering 2004; ICSE 2004; Proceedings 26th International Conference.

Cleve, A. et al. "Data Intensive System Evolution"; Issued: Aug. 2010; vol. 43, Issue 8; URL: http://ieeexplore.ieee.org/stamp/stamp.jsp?arnumber=5551058.

* cited by examiner

*Primary Examiner* — Sherief Badawi

(74) *Attorney, Agent, or Firm* — Cantor Colburn LLP; Elissa Wang

(57) ABSTRACT

A method is provided for receiving source code that includes an application programming interface (API) defined query written to communicate with an API. The API is configured to provide access to an object relational model (ORM) for converting, during execution of the source code, the API defined query into a dynamic structured query language (SQL) query comprising SQL statements. The method also includes generating a static SQL query that includes SQL statements. The static SQL query is generated in response to the ORM and to the API, by a computer, prior to the source code being executed.

18 Claims, 3 Drawing Sheets

PRE-GENERATION OF STRUCTURED QUERY LANGUAGE (SQL) FROM APPLICATION PROGRAMMING INTERFACE (API) DEFINED QUERY SYSTEMS

BACKGROUND

The present invention relates to pre-generating structured query language (SQL), and more specifically, to generating static SQL queries from application programming interface (API) defined query systems.

SQL is a standardized query language for requesting information from a database. SQL queries containing SQL statements are embedded into the source code of an application program or they are externalized (e.g., located in a file). Static SQL queries used by an application program are defined in a database before the application program executes them. The table and column names are known prior to compiling the application, with the only unknowns at compile time being the specific data value(s) that the SQL query is searching for, or updating. These unknown values are typically represented as variables. When static SQL is used, the SQL query is pre-compiled, bound, and then compiled into an execution plan as machine executable code prior to being executed in the application program. Static SQL provides a relatively high level of database security because accesses to the database are known in advance of application programs executing queries against the database. In addition, knowing the SQL queries in advance allows database administrators (DBAs) to tune the database (e.g., add an index) or to suggest changes to the SQL statements in a SQL query that may result in better performance of the SQL query during program execution.

Dynamic SQL queries are those that an application program builds and executes at run time. An interactive application program that prompts an end user for key parts of a SQL statement, such as the names of the tables and columns to be searched, is an example of an application program that uses dynamic SQL. The application program builds the SQL queries while it is running, and then submits the queries for processing. Thus, in dynamic SQL, the table and columns names are often not known prior to executing the application program. Dynamic SQL queries are also generated by query systems where a developer uses an API to define a query in an application program instead of an SQL string. A Criteria Query, as described in the Java persistence architecture (JPA) 2.0 specification, is an example of such a query methodology in a object relational mapping (ORM) system. ORM is a widely used technique to bridge the mismatch between a relational model that is based on a tabular database and an object oriented (OO) model which includes objects that are related by properties such as polymorphism and inheritance. ORM libraries automate the conversion of data between these two formats in both directions without the need for an application developer to write conversion code. ORM systems perform this conversion using metadata that describes the mapping between objects and the database.

SUMMARY

An embodiment is a method for receiving source code that includes an application programming interface (API) defined query written to communicate with an API. The API is configured to provide access to an object relational model (ORM) for converting, during execution of the source code, the API defined query into a dynamic structured query language (SQL) query comprising SQL statements. The method also includes generating a static SQL query that includes SQL statements. The static SQL query is generated in response to the ORM and to the API, by a computer, prior to the source code being executed.

Another embodiment is a system that includes a computer processor and a static query analyzer application executable by the computer processor. The static query analyzer application is configured to implement a method that includes receiving source code that includes an API defined query written to communicate with an API. The API is configured to provide access to an ORM for converting, during execution of the source code, the API defined query into a dynamic SQL query comprising SQL statements. The method also includes generating a static SQL query that includes SQL statements. The static SQL query is generated in response to the ORM and to the API prior to the source code being executed.

A further embodiment is a computer program product that includes a tangible storage medium readable by a processing circuit and storing instructions for execution by the processing circuit for performing a method. The method includes receiving source code that includes an API defined query written to communicate with an API. The API is configured to provide access to an ORM for converting, during execution of the source code, the API defined query into a dynamic SQL query comprising SQL statements. The method also includes generating a static SQL query that includes SQL statements. The static SQL query is generated in response to the ORM and to the API prior to the source code being executed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
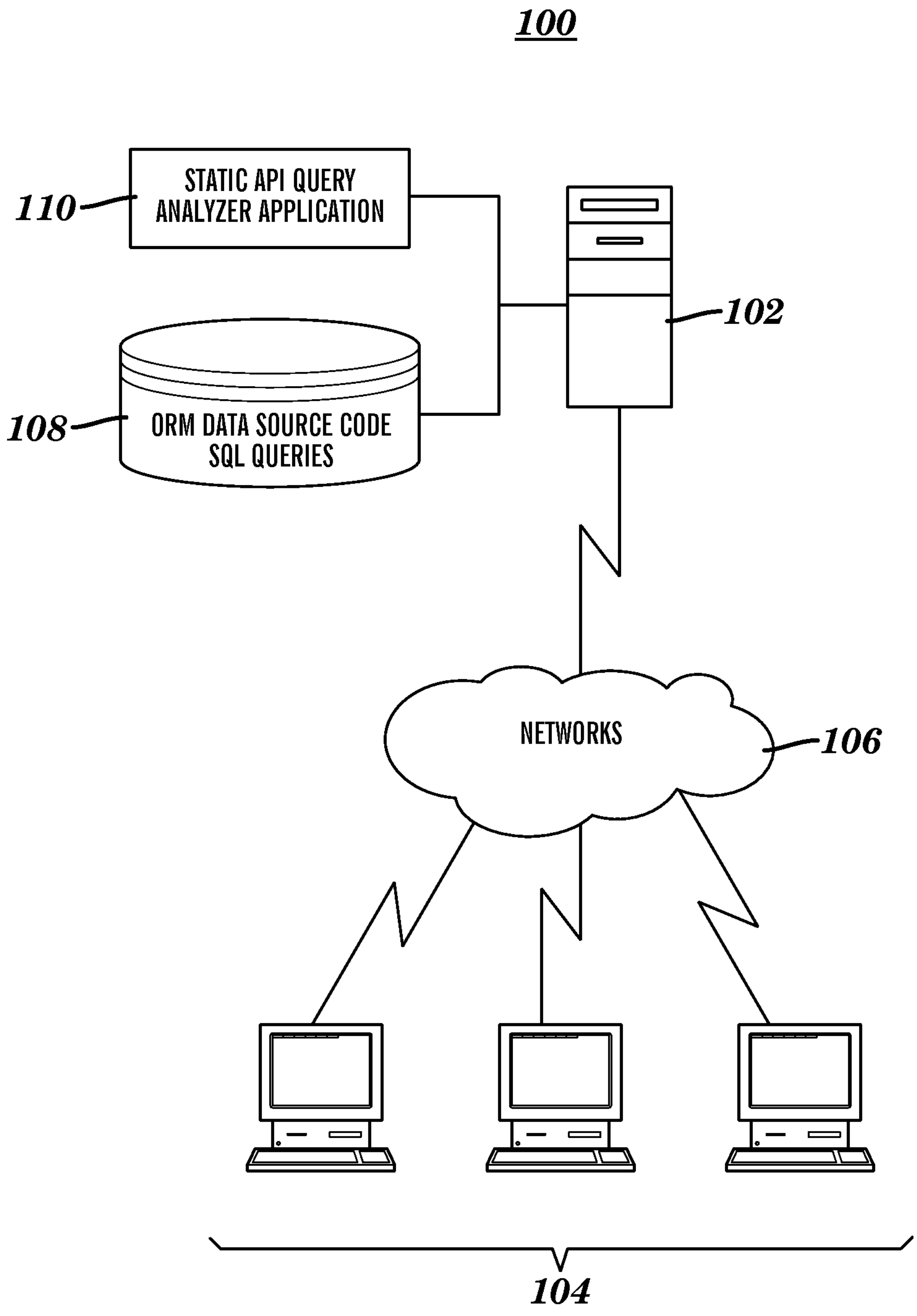
FIG. 1 illustrates a block diagram of a system for performing static API query analysis in accordance with an embodiment.

Embodiments described herein are directed to pre-generating structured query language (SQL) queries in an application programming interface (API) based query system that uses object relational model (ORM) technology. ORM technology automates the conversion of data between a relational model and an object oriented (OO) model using metadata that describes a mapping between the two different data formats. When using the ORM technology, a developer can use an API to define an OO query and an ORM to convert the API defined query into a SQL query containing SQL statements for execution against a relational database. The converting occurs during application program run-time and thus, the SQL queries are dynamic SQL queries. Embodiments described herein utilize the metadata stored in the ORM and the source code of the API defined queries to pre-generate the SQL queries that will be generated and executed by the application program during runtime. The pre-generating is performed by scanning the source of the API defined queries prior to the application program executing. The pre-generated SQL queries are then used as static SQL queries by the application program during runtime. Alternatively, or in addition, the pre-generated SQL queries are also used to tune the database.

As used herein, the term "dynamic SQL query" refers to a SQL query made up of one or more SQL statements that is built by an application program during run time (e.g., when the application is executing). As used herein, the term "static SQL query" refers to a SQL query made up of one or more SQL statements that are known prior to the application containing the SQL query being executed. A static SQL query is pre-compiled, bound, and then compiled into an execution plan as machine executable code prior to being executed in the application program.

An example of an API defined query follows:

```
List cats = sess.createCriteria(Cat.class)
.add(Restrictions.like("name","Fritz%"))
.add(Restrictions.between("weight",minWeight, maxWeight))
.list( );
```

The above API defined query is written as a hibernate Criteria Query in an ORM defined in the Java persistence architecture (JPA). This API defined query translates into a SQL query on the table "Cat" with the predicates "where name like?" and "weight between ? and ?". A Criteria Query is a query that is built taking into consideration different selection criteria specified by a user. A hibernate Criteria Query is an example of a Criteria Query implementation that includes an API query system in which SQL queries are generated based on different criteria specified by a user.

The source code in API based query systems, such as Criteria Query, does not contain SQL query strings made up of SQL statements but instead describes database accesses using Java code (or any other programming language code). In contemporary implementations, in order to obtain the SQL statements that will be generated by the Java code during runtime, the portion of the Java code that uses the Criteria Query API has to be executed. However that Java code may contain expressions that require other portions of the application code to be executed. Thus, in many cases it is necessary to execute the entire program in order to extract an SQL query from a Criteria Query based application program. Embodiments described herein avoid having to execute all or a portion of the application program by performing static analysis of the code segments of interest and building the SQL query(s) that will be generated taking into consideration the semantics of the API system used. As used herein, the term "static analysis" refers to scanning the source code to find code segments of interest (in this case the criteria queries) to deduce the output of the execution of those code segments or in general to determine the behavior of the program as a whole, taking into consideration different parts of the program which directly or indirectly influence the execution of this code segment.

An application model details the relationships between objects in an OO environment. Mapping metadata in an ORM includes the following two elements: how the tables in the relational database management system (RDBMS) should be joined (on which fields) in order to fetch data from the RDBMS for any query to any object(s) in the application model, and which fields in the database tables map to which attributes of a class in the application model. Given the above information, it is possible to use embodiments described herein to generate the fixed set of all possible SQL queries for a given application model and this information can be retrieved before actual execution of the application. Criteria Queries could then be issued for all of the possible SQL queries for a given application model. However, the number of all possible SQL queries will be relatively large compared to the number of SQL queries that will actually be used, causing this approach to be impractical due to considerations such as: the amount of resources used to generate all possible SQL queries, the performance impact of generating all possible SQL queries, and storage and retrieval constraints. Using this approach, the number of SQL queries can become very large because the SQL queries need to cover all columns in all tables with each possible comparison operator with each predicate being combined using all possible logical operators. In order to reduce the number of combinations, embodiments described herein perform a minimal static API query analysis on portions of the application source code related to Criteria Query API usage.

For a given API defined query that is translated into a SQL query made up of SQL statements during application runtime, an embodiment of the static API query analysis described herein determines only the columns/properties used by and the operator(s) used in the conditional check of the resulting SQL query. The static API query analysis described herein takes into account the nature of the Criteria Query API which follows the pattern of "Restrictions.<operator>(propertyName, . . . )" where <operator> is a fixed set of method names on the class "Restrictions" such as, but not limited to: "like", "eq", "ge", "and", and "or". This same kind of logic is applied to handle projections, orderbys, limits on the amount of data returned, and joins of the Criteria Query. The resulting SQL statements are combined to generate a SQL query. The SQL query is a static SQL query that is then compiled against the database before execution of the application program. In accordance with an embodiment, at run time, when a Criteria Query in the application code is executed, the SQL from the static SQL package is located and executed in place of the API defined query.

Turning now to FIG. 1, a system upon which the static API query analyzer processes may be implemented will now be described in an exemplary embodiment. The system 100 of FIG. 1 includes a host system 102 and one or more user systems 104 through which users at one or more geographic locations may contact the host system 102. The host system 102 executes computer instructions for implementing the exemplary static API query analyzer processes described herein. In one embodiment, the host system 102 represents an application program development environment that is used by developers located at user systems 104 to create, debug, and test application programs before they are released into a production environment.

The user systems 104 are coupled to the host system 102 via one or more networks 106. Each user system 104 may be implemented using a general-purpose computer executing a computer program for carrying out processes described herein. For example, the user systems 104 may each execute software to perform application development. The user systems 104 may be personal computers (e.g., a lap top, a personal digital assistant) or a network server-attached terminal. In an embodiment, the user systems 104 are operated by computer personnel who create or support application programs, such as programmers and database administrators (DBAs).

The networks 106 may include any type of known networks including, but not limited to, a wide area network (WAN), a local area network (LAN), a global network (e.g. Internet), a virtual private network (VPN), and an intranet. The networks 106 may be implemented using a wireless network or any kind of physical network implementation known in the art. A user system 104 may be coupled to the host system through multiple networks (e.g., intranet and Internet) so that not all user systems 104 are coupled to the host system 102 through the same network. One or more of the user systems 104 and the host system 102 may be connected to the networks 106 in a wireless fashion.

The host system 102 is communicatively coupled to a storage device 108. The storage device 108 stores data relating to the static API query analyzer processes and may be implemented using a variety of devices for storing electronic information. In an exemplary embodiment, the storage device 108 stores ORM data, source code, and SQL queries used in providing the static API query analyzer processes as will be described herein. It is understood that the storage device 108 may be implemented using memory contained in the host system 102 or it may be a separate physical device. The storage device 108 may be logically addressable as a consolidated data source across a distributed environment that includes networks 106. Information stored in the storage device 108 may be retrieved and manipulated via the host system 102.

In an embodiment, the host system 102 operates as a database server and coordinates access to application data including data (e.g., ORM data, source code, and SQL queries) stored on the storage device 108.

The host system 102 depicted in FIG. 1 may be implemented using one or more servers operating in response to a computer program stored in a storage medium accessible by the server. The host system 102 may operate as a network server (e.g., a web server) to communicate with the user systems 104. The host system 102 handles sending and receiving information to and from the user systems 104 and can perform associated tasks.

The host system 102 may also operate as an application server. The host system 102 executes one or more computer programs to implement the static API query analyzer processes. As shown in FIG. 1, these computer program(s) are implemented by a static API query analyzer application 110.

Figure 2:
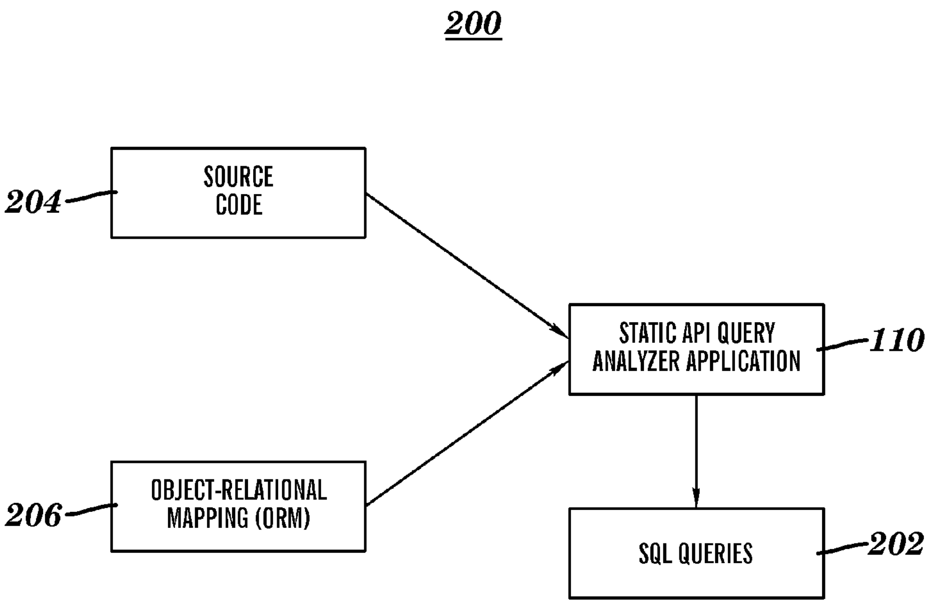
FIG. 2 illustrates a block diagram of a data flow for performing static query analysis in accordance with an embodiment.

Referring to FIG. 2, a block diagram of a data flow for performing static API query analysis in accordance with an embodiment is generally shown. Both source code 204 and an ORM 206 are input to the static API query analyzer application 110. In one embodiment, the source code 204 includes Java instructions with embedded API defined queries. In another embodiment, the source code 204 includes just the API defined queries, and the queries are merged with Java instructions located in a different file location during execution time.

The ORM 206 provides the ability to map a data representation of an object model to a relational data model and its corresponding database schema. For example, in a Java computing environment, the ORM 206 takes care of the mapping from Java classes to database tables, as well as the mapping from Java data tables to SQL data types used in database. Note that throughout this application and for the purposes of illustration only, Java is used as an example of a programming language. However, embodiments are not so limited; other programming languages, such as .NET, and other languages such as those that are not cross platform may also be implemented. The static API query analyzer application 110 scans and analyzes the source code 204 (e.g., the API defined queries) in view of the ORM 206 to generate the SQL queries 202 that will result when the source code 204 is executed.

Figure 3:
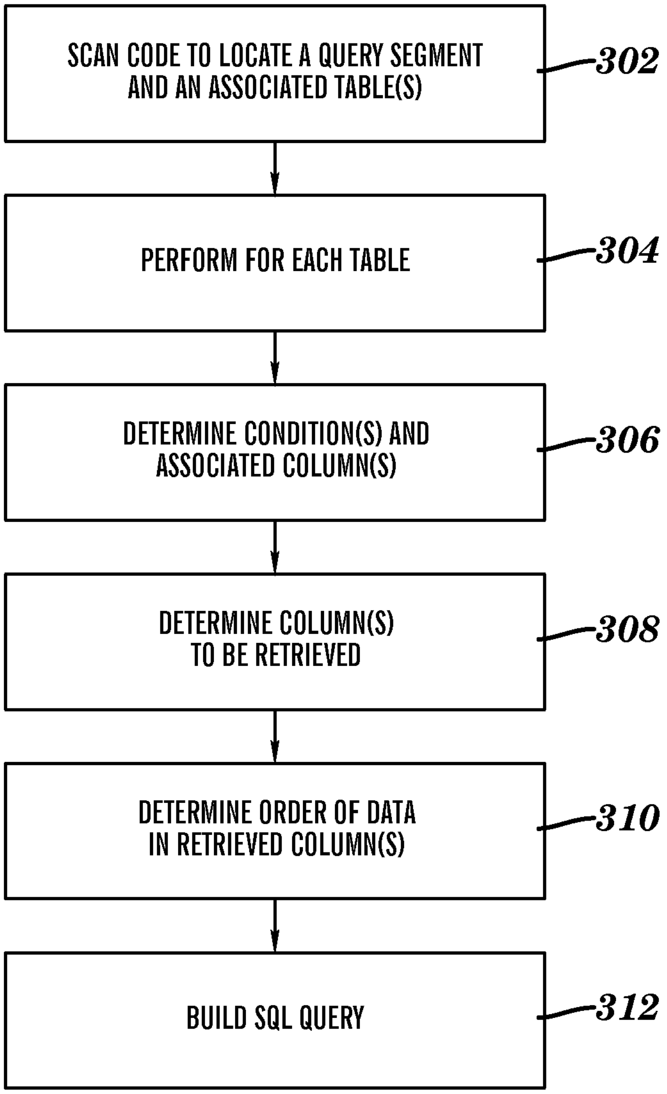
FIG. 3 illustrates a process flow performed by a static API query analyzer in accordance with an embodiment.

Referring to FIG. 3, a process flow performed by a static query analyzer, such as static API query analyzer application 110, in accordance with an embodiment is generally shown. The static query analysis works on the pattern that an API based query system uses in order to read, interpret and generate the SQL queries. The embodiment described in reference to FIG. 3 uses hibernate Criteria Queries and JPA 2.0 as an example API based query environment. In accordance with an embodiment, the static query analyzer scans the application source code to determine the segments of code that make calls to the API based query system. A second scan is then carried out on these segments to determine the different API calls made. During the second scan of each identified segment, the SQL query that would have been generated by that segment during application runtime is built without having to execute the application program. The resulting static SQL query contains all of the SQL statements that would have been contained in the dynamic SQL query if it had been generated during runtime of the application using the ORM and API defined query.

In one example, there are two tables called "Topics" and "Comments" with a one to many association from Topics to Comments specified in the ORM as below.

```
@Table(name="Topics") Class Topic
@column(name="topic_id") title
@column(name="author") authname
@OneToMany Collection<Comment> commentlist
@Table(name="comments") Class Comment
@column(name="comment_id") id
@column(name="comment_text") text
@column(name="commentor") commentor
@ManyToOne Topic
```

The above two models (also referred to herein as "ORM data") are used to describe the processing in FIG. 3.

The following API defined query is used, in conjunction with the ORM Topic and Comment models above for describing the process flow in FIG. 3.

```
List topics = session.createCriteria(Topic.classs)
.add(
Restrictions.or(
Restrictions.like("title", new String ("My Topic"),
MatchMode.ANYWHERE),
Restrictions.like("authname", new String ("Praveen")))
.setProjection(Projections.projectionlist( )
.add(Projections.property("authname"))
.addOrder(Order.asc("id"))
.createCriteria("commentlist")
.add(Restrictions.like("text", new String("foo")
.add Restrictions.eq("id", new Long(4)))
.list( );
```

According to the structure of the API, a dynamic SQL query is initiated by a call to a method named "createCriteria" and is terminated by a call to a method named "list" or "scroll" or "unique result". In an embodiment, an Eclipse Java development tools (JDT) library is used to verify that these methods are being called on the correct class instance. The results of the query are constrained using any of the methods in the "Restrictions" class, ordered using methods in the "Order" class, and joined to other tables/objects using methods of the "Criteria" class. Methods in the "Projections" class are used to choose only specific columns or computed values in the projection list.

Referring to block 302 of FIG. 3, the source code is scanned to locate a query segment and associated tables. In an embodiment, the source code is the application program code written in a programming language such as Java, C++ etc with embedded API defined queries. In another embodiment, the source code is a separate file that contains just the source code of the API defined queries. The source code is scanned to determine where the createCriteria call is invoked at block 302. The Java class type which is the parameter to the createCriteria method indicates the object model on which the query is being issued. For the example API defined query above, it is determined that the query is built for the model class "Topic" and maps to the "Topics" table. The scan continues through the source code segment looking for the methods "createAlias" and "createCriteria" to determine any other tables that are joined in this query. The first parameter to these methods is the name of the other table being joined. In the example API defined query above, a call to createCriteria is made with the first parameter "commentlist" an attribute in model "ClassTopic" that maps to the "Comments" table.

The SQL segment generated by block 302 is "inner join comments on topics.topic_id=comments.topic_id."

As described in block 304, blocks 306-310 are performed for each "createAlias" or "createCriteria" found in block 302. Conditions and associated columns of the SQL query are determined at block 306 by scanning each method (e.g., static methods, instance methods) of the "Restrictions" class used in the code segment. The first parameter of the method invocation gives the column on which the condition is being applied and the method name is the operator applied on the column. Using the specified example, the following restrictions were applied to the Topics table: operator like on column topics.topic_title and operator like on column topics.author; and the following restrictions were applied to the Comments table: operator like on column comments.comment_text and operator equal on comments.comment_id.

The SQL segment generated by block 306 is "(topics.topic_title like ? OR topics.author like ?) and comments.comment_text like ? and comments.comment_id=?".

The API defined query (also referred to herein as "the code segment") is then analyzed at block 308 to determine columns to be retrieved by the SQL query, the aliases to be used and the way the data needs to be grouped. The code segment is scanned for the static method "property" of the "Projections class" used in this code segment. The first parameter of this method is the column that should appear in the projection list (i.e., the column that should be retrieved by the query). In addition, the code segment is scanned for other methods of the "Projections" class. The name of the method infers the aggregate function (which can include user-defined functions) in a database that should be added to the projection list. If the method has a parameter, then it is the name of a column of the table in the database on which the aggregate function is being applied and the column name is passed as a parameter to database user defined function (udf). The name of the method can also indicate that a grouping clause needs to be applied and the parameter "to" indicates the column on which the grouping is to be done.

Using the specified example, the "Projections.property" method is called with the parameter "authname".

The SQL segment generated by block 308 is "topics.author"

The code segment is analyzed at block 310 to determine an order of the retrieved data. This is performed by the scan for each method of the "Order" class used in this code segment. The parameter to these methods is the column on which the database result should be ordered. The name of the method implies the ordering (ascending or descending).

In the specified example, an ascending or "asc" method on class "Order" is invoked with parameter "id".

The SQL segment generated by block 310 is "order by id asc."

At block 312, the SQL query is built by concatenating the SQL segments in the appropriate order.

The SQL query generated by the example API defined query is "select topics.author from topics inner join comments on topics.topic_id=comments.topic_id where (topics.title like ? OR topics.author like ?) and comments.text like ? and comments.comment_id ? Order by id asc."

In an embodiment, the pre-generated SQL query is used to tune the databases prior to the application program containing the API defined query being executed. For example, an index may be added to a table, a relationship may be set up between two tables, and/or the data stored in the database may be reordered in order to optimize the performance of the static SQL query. In an embodiment, the static SQL query generated at block 312 is stored and used in place of the API defined query when the application program is executed. The static SQL query is pre-compiled, bound, and then compiled into an execution plan as machine executable code prior to being executed in the application program. In another embodiment, the static SQL query generated at block 312 is used to tune the databases and the application program executes using a dynamic SQL query generated by the ORM.

The present exemplary embodiment is specific to hibernate Criteria Queries and JPA 2.0 as an API based query environment, however it will be appreciated that embodiments described herein may be implemented in any OO API based query environment. Other types of query environments supported by exemplary embodiments include, but are not limited to a .Net LINQ method-based query system, a Rails Arel query system, and a Drupal dynamic query system.

An example .Net LINQ query follows:

```
results = topics. AsEnumerable( )
.Where(topic => topic.Field<Int32>("topic_id") == 10)
.OrderBy(topic => topic.Field<String>("authname"), new
CaseInsensitiveComparer( ))
.Select(t => new {t.authname });
```

The .Net LINQ starts with a method call "AsEnumerable" on the "DataTable" object and proceeds to the other method invoked. Referring to the example above, the "Where" method forms the predicate part of the SQL in this case resolving to "topic_id=?". The "orderBy" method generates the "ORDER" clause of the SQL on the column "authname" to be ordered in ascending order, "ORDER BY authname asc." The "Select" method specifies the projection list of the SQL, in this case the column being authname.

Technical effects and benefits include the ability to use static SQL queries in the first execution run of an application program. In accordance with embodiments there is no need to run the application program or its use cases to enable static SQL queries. This eliminates the need to create and maintain test code and/or manual operations to execute the application use cases that exercise the Criteria Query code paths. This also results in the elimination of performance overheads during runtime to capture the dynamically generated SQL in order to determine the actual SQL queries being executed by the application program. Another benefit is that there are no post deployment tasks related to tuning the query having to be performed once the application program is in production/final test.

Additional benefits are realized by limiting the requirements for static code analysis to determining just the columns and operators used by a SQL query based on the nature of ORM API layout. In accordance with embodiments, where restrictions are being added based on conditional programming constructs, like if/else, all possible combinations of SQL predicates are generated. This ensures that all the possible SQL queries are pre-generated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:

receiving source code comprising an application programming interface (API) defined query written to communicate with an API, the API configured to provide access to an object relational model (ORM) for converting, during execution of the source code, the API defined query into a dynamic structured query language (SQL) query comprising SQL statements, wherein the API defined query in the source code comprises one or more names of tables of a database;

before execution of the source code, performing static analysis of the source code to locate the API defined query and to determine the one or more names of tables of the located API defined query;

before execution of the source code, scanning the located API defined query in the source code to determine a respective set of restrictions that are defined in the source code for each of the one or more named tables of the API defined query;

before execution of the source code, determining contents of the SQL statements based on the one or more names of tables and respective sets of restrictions, the determining based on the API defined query, to the API, and to the ORM;

before execution of the source code, generating a static SQL query comprising the SQL statements, the generating performed by a computer prior to the source code being executed, the generating based on the source code, to the ORM, and to the API;

before execution of the source code, pre-compiling, binding and compiling the generated static SQL query into an execution plan comprising machine executable code corresponding to the generated static SQL query; and during execution of the source code, locating the execution plan comprising the machine executable code corresponding generated static SQL query and executing the execution plan in place of the API defined query.

2. The method of claim 1, wherein the API defined query is a Criteria Query.

3. A computer system comprising:

a memory of the computer system;

a computer processor of the computer system; and a static query analyzer application executable by the computer processor of the computer system, the static query analyzer application configured to implement a method, the method comprising:

receiving source code comprising an application programming interface (API) defined query written to communicate with an API, the API configured to provide access to an object relational model (ORM) for converting, during execution of the source code, the API defined query into a dynamic structured query language (SQL) query comprising SQL statements, wherein the API defined query in the source code comprises one or more names of tables of a database;

before execution of the source code, performing static analysis of the source code to locate the API defined query and to determine the one or more names of tables of the located API defined query;

before execution of the source code, scanning the located API defined query in the source code to determine a respective set of restrictions that are defined in the source code for each of the one or more named tables of the API defined query;

before execution of the source code, determining contents of the SQL statements based on the one or more names of tables and respective sets of restrictions, the determining based on the API defined query, to the API, and to the ORM;

before execution of the source code, generating a static SQL query comprising the SQL statements, the generating performed by a computer prior to the source code being executed, the generating based on the source code, to the ORM, and to the API;

before execution of the source code, pre-compiling, binding and compiling the generated static SQL query into an execution plan comprising machine executable code corresponding to the generated static SQL query; and during execution of the source code, locating the execution plan comprising the machine executable code corresponding to the generated static SQL query and executing the execution plan in place of the API defined query.

4. The system of claim 3, wherein the API defined query is a Criteria Query.

5. A computer program product comprising:

a tangible storage medium readable by a processing circuit and storing instructions for execution by the processing circuit for performing a method comprising:

receiving source code comprising an application programming interface (API) defined query written to communicate with an API, the API configured to provide access to an object relational model (ORM) for converting, during execution of the source code, the API defined query into a dynamic structured query language (SQL) query comprising SQL statements, wherein the API defined query in the source code comprises one or more names of tables of a database;

before execution of the source code, performing static analysis of the source code to locate the API defined query and to determine the one or more names of tables of the located API defined query;

before execution of the source code, scanning the located API defined query in the source code to determine a respective set of restrictions that are defined in the source code for each of the one or more named tables of the API defined query;

before execution of the source code, determining contents of the SQL statements based on the one or more names of tables and respective sets of restrictions, the determining based on the API defined query, to the API, and to the ORM;

before execution of the source code, generating a static SQL query comprising the SQL statements, the generating performed by a computer prior to the source code being executed, the generating based on the source code, to the ORM, and to the API;

before execution of the source code, pre-compiling, binding and compiling the generated static SQL query into an execution plan comprising machine executable code corresponding to the generated static SQL query; and during execution of the source code, locating the execution plan comprising the machine executable code corresponding to the generated static SQL query and executing the execution plan in place of the API defined query.

6. The computer program product of claim 5, wherein the API defined query is a Criteria Query.

7. The method of claim 1, further comprising tuning the database based on the generated static SQL query before executing the source code;

generating a dynamic SQL query based on the static SQL query by the ORM during execution of the source code; and executing the dynamic SQL query against the tuned database during execution of the source code.

8. The system of claim 3, wherein the method further comprises tuning the database based on the generated static SQL query before executing the source code;

generating a dynamic SQL query based on the static SQL query by the ORM during execution of the source code; and executing the dynamic SQL query against the tuned database during execution of the source code.

9. The computer program product of claim 5, wherein the method further comprises tuning the database based on the generated static SQL query before executing the source code;

generating a dynamic SQL query based on the static SQL query by the ORM during execution of the source code; and executing the dynamic SQL query against the tuned database during execution of the source code.

10. The method of claim 7, wherein tuning the database comprises adding an index to a table based on the static SQL query.

11. The method of claim 7, wherein tuning the database comprises setting a relationship between two tables based on the static SQL query.

12. The method of claim 7, wherein tuning the database comprises reordering data that is stored in the database based on the static SQL query.

13. The system of claim 8, wherein tuning the database comprises adding an index to a table based on the static SQL query.

14. The system of claim 8, wherein tuning the database comprises setting a relationship between two tables based on the static SQL query.

15. The system of claim 8, wherein tuning the database comprises reordering data that is stored in the database based on the static SQL query.

16. The computer program product of claim 9, wherein tuning the database comprises adding an index to a table based on the static SQL query.

17. The computer program product of claim 9, wherein tuning the database comprises setting a relationship between two tables based on the static SQL query.

18. The computer program product of claim 9, wherein tuning the database comprises reordering data that is stored in the database based on the static SQL query.

* * * * *